United States Patent
Holloway et al.

[19]

[11] Patent Number: 5,982,861
[45] Date of Patent: Nov. 9, 1999

[54] ELECTRONIC DIRECTORY AND ENTRY CONTROL SYSTEM

[75] Inventors: B. Scott Holloway, Mays Landing; Charles W. Tevis, Marlton, both of N.J.; Niel Mazurek, Hungtindon, Pa.; Joseph G. Gangi, Pottstown, Pa.; Mark M. Schwandt, Telford, Pa.

[73] Assignee: Marlee Electronics Corporation, Philadelphia, Pa.

[21] Appl. No.: 08/703,944

[22] Filed: Aug. 28, 1996

[51] Int. Cl.$^6$ .................................................. H04M 11/00
[52] U.S. Cl. .................. 379/102.06; 379/52; 379/102.01
[58] Field of Search ......................... 379/102.01, 102.02, 379/102.06, 52; 340/825.19

[56] References Cited

U.S. PATENT DOCUMENTS

| | | | |
|---|---|---|---|
| 3,917,911 | 11/1975 | Lesher | 379/102.06 |
| 4,435,732 | 3/1984 | Hyatt | 358/254 |
| 4,644,104 | 2/1987 | Middlemiss | 379/102.06 |
| 4,685,081 | 8/1987 | Richman | 365/1 |
| 4,862,499 | 8/1989 | Jekot et al. | 379/368 |
| 4,903,290 | 2/1990 | King | 379/52 |
| 4,964,124 | 10/1990 | Burnett | 379/15.1 |
| 5,027,111 | 6/1991 | Davis et al. | |
| 5,081,673 | 1/1992 | Engelke et al. | 379/52 |
| 5,475,741 | 12/1995 | Davis et al. | 379/103 |

*Primary Examiner*—Curtis A. Kuntz
*Assistant Examiner*—Melur Ramakrishnaiah
*Attorney, Agent, or Firm*—Darby & Darby, P.C.

[57] ABSTRACT

An electronic directory and entry control system includes, in different embodiments, a scheme for cooling a liquid crystal display ("ILCD") and an interface for a Telecommunications Device for the Deaf ("TDD"). Because entry control systems are commonly installed outdoors under uncontrollable temperature conditions, and because LCDs are typically inoperable in high temperatures, a first embodiment of the present system utilizes a solid-state thermoelectric cooling device to maintain the LCD within a preferred temperature range. Further, because entry control systems typically rely on verbal communications between a visitor and a tenant in determining whether the visitor should be admitted, such systems are often of no use when hearing-impaired individuals visit. Accordingly, a second embodiment of the present system allows for TDD use in communication between hearing-impaired visitors and tenants. The second disclosed embodiment further provides the ability to use a relay service for communication between a hearingimpaired visitor and an unimpaired tenant, or between an unimpaired visitor and a hearing-impaired tenant.

24 Claims, 3 Drawing Sheets

ELECTRONIC DIRECTORY AND ENTRY CONTROL SYSTEM

BACKGROUND OF THE INVENTION

The invention relates to electronic entry control systems, and more particularly to self-contained electronic directory and entry control systems having liquid crystal directory displays, used to control access to apartment buildings and the like.

In apartment buildings, commercial office buildings, and other multi-tenant complexes, it is common practice to limit access to common areas to those individuals living and/or working within the complex, as well as their authorized guests and visitors. Of course, this can be accomplished in a simplistic manner by merely locking all access doors and providing tenants with keys. However, this approach has proven to be inconvenient and cumbersome in the admission of guests and visitors, as the tenant must physically unlock the door each time someone is to be admitted. Furthermore, with such a system, it is often difficult to determine whether a person is present at a door and desires admission. In the business environment, this can lead to a substantial loss in productivity.

One past attempt to resolve this problem has focused on the use of a dedicated intercom system. In such a system, a visitor actuates a button on an intercom panel outside the complex, alerting the desired tenant to his presence. Optionally, voice communication capability can be provided so that the visitor can establish his identity. Once it has been determined that the visitor is authorized to be admitted, the tenant can either physically unlock the door himself or press a button on the interior intercom panel to actuate a door unlocking mechanism.

The intercom system has several disadvantages. First, significant dedicated wiring is required to support the intercom at the entry door and to provide communication with each tenant unit. Furthermore, if remote door actuation capability is to be provided, further rewiring can be necessary. Expensive intercom hardware is required to be installed within each tenant unit. Finally, if many tenants reside within the complex, providing an individual "call" button for each tenant can result in a prohibitively large intercom unit at the entry door.

In response to the disadvantages of entry systems using dedicated intercoms, telephone-based entry systems have been proposed. Significant rewiring is not necessary, other than to provide electrical power and telephone line access to the station at the entry door. When a visitor desires access, he will place a telephone call from the entry system to the desired tenant, who will either physically unlock the door or, by using the touch-tone keypad on the telephone, provide an authorization signal to the entry system, which will then actuate a door unlocking mechanism. Additional expensive hardware is not needed for each tenant unit, as substantially all tenants have access to telephone equipment and a telephone line. Finally, since each tenant is addressable through a unique telephone number, a separate call button for each tenant is not necessary; numeric codes can be used.

With the resolution of the foregoing recognized problems by the use of telephone-based entry systems, other disadvantages have become apparent. Where a typical intercom system might have a separate call button for each individual tenant, each button can be labeled, making it easy to locate any desired tenant. Where no individual call buttons exist, however, a separate directory of tenants should be provided. Where there is a large number of tenants, the directory can be physically quite large. Moreover, labor involved in the maintenance of such directories to reflect tenant turnover can be significant, particularly when there are several entry doors to the complex.

Accordingly, the need for an easily updatable electronic directory has been recognized. Such a goal is readily accomplished by using digital computer technology. As is well known, a small digital computer, with memory, can be used to store tenant names, telephone numbers, access codes, dialing codes, and other information within the entry system, at the expense of little additional cost or size. The electronic storage of such information makes it possible to update directory information with little or no effort; the revised information can be communicated to the digital computer through a data port, or even remotely via telephone lines.

The use of an electronic display, however, introduces further difficulties. Various display technologies are known and available for use. For example, a cathode ray tube ("CRT") video display, as is typically used for desktop computers, can easily be adapted for use as a directory display. However, CRT displays are generally large, heavy, and fragile, making them ill-suited for in-wall directory use. Furthermore, CRT displays consume a large amount of power. Light emitting diode ("LED") displays are also known, but are expensive and bulky when produced in sizes sufficient to display directory information. Fluorescent and gas-discharge displays, since they make use of a gas-filled glass tube, are also relatively fragile. Moreover, all of the foregoing display devices are light-emitting, which makes them difficult to see under bright light conditions, as in direct sunlight.

Liquid crystal displays ("LCDs") are also known. They have the advantages of low cost and low power requirements. Such displays are selectively reflecting rather than light-emitting, so they are best viewed with ambient light, including bright light conditions that would "wash out" other types of displays. However, LCDs are also easily viewable in low light conditions when backlit.

Unfortunately, LCDs are known to be temperature-sensitive. As temperature increases, the contrast of the display will often decline until it is unreadable. This is a particular problem where entry systems utilizing LCD directories are installed outdoors, in direct sunlight, or elsewhere under adverse temperature conditions. Furthermore, when an LCD is installed in a sealed enclosure with a viewing window, the temperature inside the enclosure may increase to a level far beyond the air temperature outside the enclosure due to a "greenhouse effect."

A variety of attempts have been made to solve the temperature sensitivity problem; none has proven to be entirely successful. One possibility is to provide a "hood" over the display to ensure that the display is shaded. This approach has the disadvantage of reducing the amount of light reaching the display, and it also limits the angles from which the display may be viewed. Furthermore, such an approach does not provide temperature reduction, per se; it merely reduces the possibility that direct sunlight from certain angles will raise the temperature.

A second possibility is to ventilate the enclosure containing the LCD. However, this raises an opportunity for potential vandalism and damage to the entry system, as access to the interior of the enclosure is provided. Furthermore, ventilation of air to the interior of the enclosure will also allow the elements to invade the enclosure to some extent. Damage from oxidation, moisture, and other contaminants can accelerate the deterioration of the entry system and impair reliability. A further possibility is to provide a cooling fan. This, too, is unsatisfactory: moving parts are added to a system that could otherwise be entirely without them; furthermore, mechanical fans are noisy and potentially unreliable. When a fan is provided within a sealed enclosure, very little cooling action is possible.

It is recognized herein that the addition of an electronic display to an entry system complicates the system significantly. Adding the display unit will increase the size and cost of the entry system. Furthermore, if the display unit is of a size insufficient to display all tenant names at one time, a mechanism must be provided to determine which names are shown on the display. This can be accomplished by providing control buttons on the entry system, beyond those necessary for a simple telephonic keypad. Adding these additional controls will further raise the cost and complexity of the system, as well as the operational complexity to a typical user.

Substantially all practical systems of the type described herein providing communications capability between a visitor and a tenant, do so with audio communication. This type of communication is easily accomplished over the telephone system, and requires little additional circuitry or complexity to the system, beyond that already required to access the telephone system. Individuals who are deaf or hearing-impaired are not generally able to use these types of entry systems effectively.

Accordingly, a need exists for an entry control system that avoids the many shortcomings of prior devices. Specifically, a need exists for a self-contained entry system that has a directory display that is easily visible under substantially all lighting conditions, and is resistant to adverse temperature conditions. A further need exists for an entry system that provides accessibility to deaf and hearing-impaired individuals. To reduce costs, such a system should minimize unneeded complexity.

SUMMARY OF THE INVENTION

The present invention resolves the aforementioned limitations of prior security entry systems. A self-contained electronic security entry system according to the present invention includes an enclosure, a keypad, a liquid crystal display ("LCD"), and a telephone interface.

The LCD is provided with increased resistance to adverse temperature conditions by the inclusion of a solid-state thermoelectric cooling device. The cooling device is responsive to the temperature within the enclosure, and operates to remove heat from the LCD when a threshold temperature is exceeded. Because heat is transferred away from the LCD, the enclosure can remain sealed, providing enhanced resistance to vandalism and weather conditions. Furthermore, because a solid-state thermoelectric cooling device is used, no moving parts are necessary, enhancing reliability in comparison to devices that include mechanical fans. Accordingly, an entry system according to the present invention is operable under an increased range of environmental conditions.

The present invention includes an integrated sixteen-key keypad. This provides the entry system with the controls necessary to manipulate the directory display, while retaining much of the low cost and simplicity of a twelve-key keypad like those used on telephone equipment. Because the display controls are integrated into the keypad, additional buttons are not necessary. This provides increased reliability, resistance to vandalism, and simplicity in operation.

The present invention also provides accessibility to deaf and hearing-impaired individuals. An interface for a "Telecommunications Device for the Deaf" ("TDD") is provided. A TDD is a standardized device utilized by hearing-impaired individuals to communicate telephonically with other people, whether or not hearing-impaired. A TDD is a self-contained apparatus including an alphanumeric keyboard and a display; text messages are composed and transmitted as digital data by way of the keyboard and display.

When access to a telephone line is provided, one TDD can communicate telephonically with another TDD via encoded audio signals generally meaningless to human hearing. Such signals are passed over the telephone lines as a computer-to-computer "modem" communication would be.

For communication between a TDD-using person and a person with unimpaired hearing, "relay services" are mandated by the United States federal government to be provided by telephone companies and other telecommunication service providers. Relay services, which are often accessible by dialing toll-free access numbers, are staffed by operators using TDD terminals. Relay service operators communicate with the hearing-impaired caller via TDD, and with the unimpaired caller by voice, reading and transcribing as necessary.

By way of the TDD interface provided in the system of the present invention, a TDD-using visitor can call a TDD-using tenant directly through the entry system, or can call a hearing-unimpaired tenant indirectly through a relay service. A hearing-unimpaired visitor can also call a TDD-using tenant through a relay service. In any of the above cases, the tenant can then either pass an entry code along to the visitor, or under certain circumstances can operate the entry system remotely.

The foregoing features illustrate that an electronic security entry system in accordance with the present invention is improved in comparison to prior devices.

DESCRIPTION OF THE PREFERRED EMBODIMENT

As required, a detailed illustrative embodiment of the present invention is disclosed herein. However, an electronic directory and security entry system in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
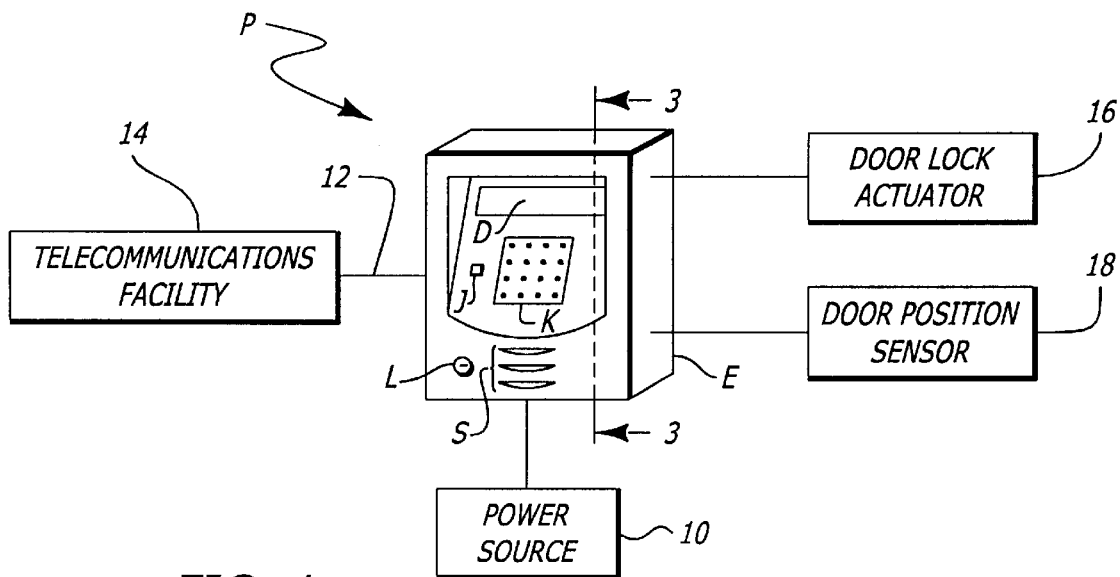
FIG. 1 is a block diagram illustrating the external connections utilized by an electronic security entry system according to the present invention.

Referring initially to FIG. 1, an entry control panel P according to the present invention is shown coupled to several external subsystems. The entry control panel P has a keypad K, through which a visitor can interact with the system, and a display area D, through with the system can provide information to the visitor. The entry control panel P is included within an enclosure E, which is designed to be substantially vandal proof and weather resistant. However, to facilitate audio transmission through the enclosure E, a series of slots S are provided, behind which a speaker and a microphone (not shown in FIG. 1) may be located.

In one embodiment, the entry control panel P is furnished with a postal lock L which, when actuated by a postal employee having the proper key, automatically provides authorized access to the controlled area for mail services.

The entry control panel P is connected to a power source 10. The power source 10 is necessary to drive the electronic hardware within the entry control panel P. The entry control panel P is further connected to a telephone line 12, which is ultimately coupled to a telecommunications facility 14. In this manner, the entry control panel P is connected to the telephone system, and can thereby communicate with telephones possessed by each tenant within the controlled area.

The entry control panel P drives a door lock actuator 16. By energizing the door lock actuator 16, the entry control panel P can unlock the door to the controlled area for specified periods of time to permit authorized individuals to enter or exit. In one embodiment of the present invention, the door lock actuator 16 is an electromagnetic solenoid, which mechanically manipulates a physical door lock to control access.

Generally, a visitor using the entry control panel P will select a tenant by manipulating the keypad K until the proper tenant name is shown within the display area D. Corresponding to the desired tenant will be a numeric code, which the visitor will enter using the keypad K.

The entry control panel P will translate the numeric code into the desired tenant's telephone number, and connection to the desired tenant will be established through the telecommunications facility 14. The visitor and tenant can exchange information, by way of audio communication, as desired. If the tenant authorizes the visitor's entry, the tenant can cause the entry control panel P to unlock the door by sending an audio authorization code over the telephone line 12 to the entry control panel P. Such an authorization code may be in the form of a "touch-tone" digit, entered on the tenant's telephone, or a sequence thereof.

Upon receipt of the audio authorization code, the entry control panel P will send a signal to the door lock actuator 16, thereby unlocking the entry door for a time period sufficient to allow the visitor to enter. The entry door will then be locked. In one embodiment of the present invention, a door position sensor 18 is provided, so that the entry control panel P can determine when an authorized visitor has finished passing through the door.

In accordance with one of the advantages of the present invention, a TDD jack J is defined by the enclosure E. Through the TDD jack J, which is of standard design and dimensions, a deaf or hearing-impaired visitor is able to communicate with a tenant directly or by way of a relay service.

Figure 2:
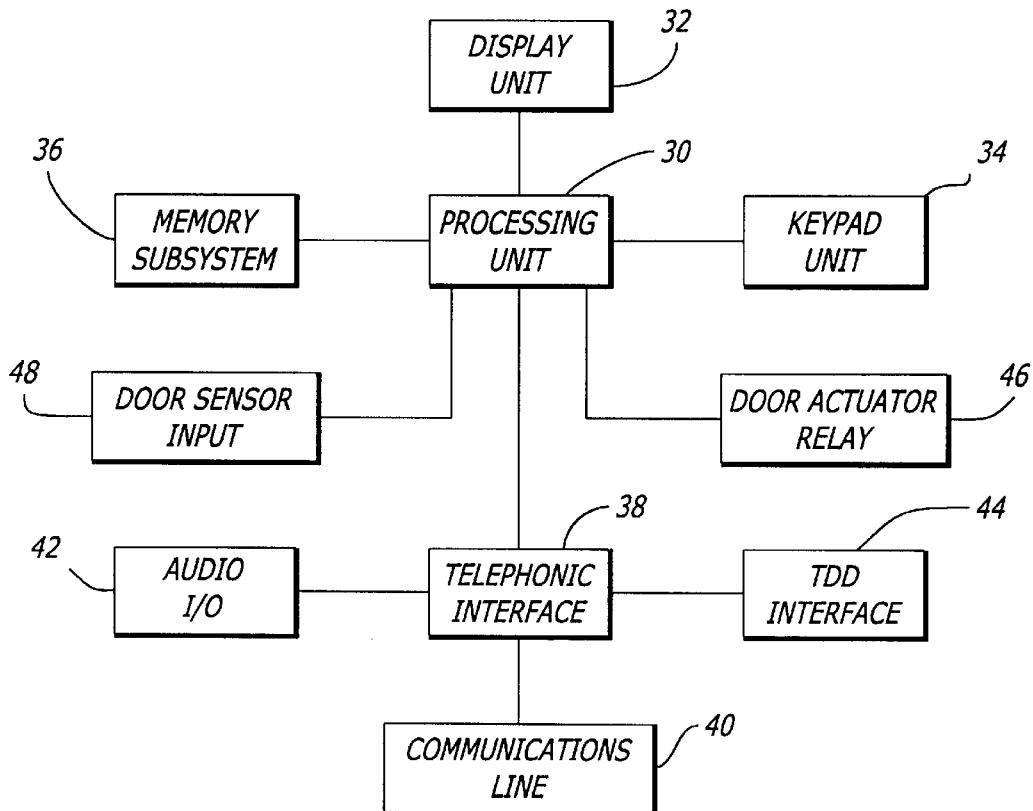
FIG. 2 is a functional block diagram illustrating the internal subsystems of the electronic security entry system of FIG. 1.

Components internal to the entry control panel P are considered in connection with FIG. 2. Central to the operation of the entry control panel P is a processing unit 30. The processing unit 30, which is contemplated to be a combination of computer hardware with software programming to perform certain desired functions, is connected to a number of functional subsystems as set forth below.

The processing unit 30 is coupled to a display unit 32. The display unit 32 is a four line by forty character liquid crystal display ("LCD"), cooled as necessary in accordance with FIG. 4. The display unit 32 is adapted to receive electrical signals representative of visual information from the processing unit 30, and to recreate said visual information from the electrical signals. The display unit 32 is used by the present invention to present directory information to the user, as well as to provide messages generated by the processing unit (e.g. "Tenant Unavailable" or "Incorrect Code") to the user as necessary.

The processing unit 30 is also coupled to receive data from a keypad unit 34. The user uses the keypad unit 34 to submit authorization codes and tenant codes to the entry control panel P (FIG. 1) for action by the processing unit 30.

Tenants' names, their telephone numbers, access codes, and tenant codes are stored in a memory subsystem 36, which is also coupled for data transfer to and from the processing unit 30. When the entry control panel P is utilized by a user, directory information is retrieved by the processing unit 30 from the memory subsystem 36 and shown on the display unit 32. The user can manipulate certain keys on the keypad unit 34 to direct the processing unit 30 to retrieve certain information for display.

In a preferred embodiment, the keypad unit 34 is a single sealed unit having 16 keys. In such a case, enough keys are available for a 12-key numeric keypad (as on a traditional telephone), as well as for additional keys to control the information presented on the display unit 32 (e.g. "scroll up," "scroll down," "enter," and "cancel").

This arrangement eliminates the need for separate buttons to control the information on the display unit 32, and by reducing the component count, potentially provides cost reduction and an improvement in reliability. Furthermore, ease of use is enhanced by providing all necessary controls in a single area.

A telephonic interface 38 is also provided to the processing unit 30. The telephonic interface 38 connects the entry control panel P to a communications line 40, typically a standard analog telephone line. Through the telephonic interface 38, the entry control panel P is capable of digital communications with a remote computer, by way of "touch tone" signals and other known protocols, for programming and other purposes. Accordingly, the telephonic interface 38 is also capable of receiving and decoding touch tone signals generated manually by a tenant's telephone equipment and received over the communications line 40. This capability can be utilized by the processing unit 30, as discussed above, to accommodate a remote door unlocking function.

The telephonic interface 38 includes an audio input/output device 42. In a preferred embodiment, the audio input/output device 42 includes a speaker for audio output and a microphone for audio input; alternatively, the speaker and microphone may be combined into a single unit as is known in the art. The audio input/output unit 42 provides the entry control panel P with audio communication capability over the communications line 40. This is used for voice communications between a visitor using the entry control panel P and a tenant using a remote telephone device.

A Telecommunications Device for the Deaf ("TDD") interface 44 is also part of the telephonic interface 38. The TDD interface 44 is provided as an alternative to the audio input/output unit 42, for those visitors who are deaf or hearing-impaired. Rather than voice communications being made over the communications line 40, the TDD utilized by the hearing-impaired visitor generates an encoded signal, which is passed over the communications line 40 to a remote TDD.

Additional input and output facilities are available in the form of a door actuator relay 46 and a door sensor input 48. The door actuator relay 46 provides a means by which the processing unit 30, generally a low-power device, can control the door lock actuator 16 (FIG. 1), which in a typical embodiment can require a large amount of power to operate. Similarly, the door sensor input 48 receives a signal from the door position sensor 18, and translates the signal into data meaningful to the processing unit 30.

The operation of the foregoing subsystems will be considered in further detail below in connection with FIG. 5.

Figure 3C:
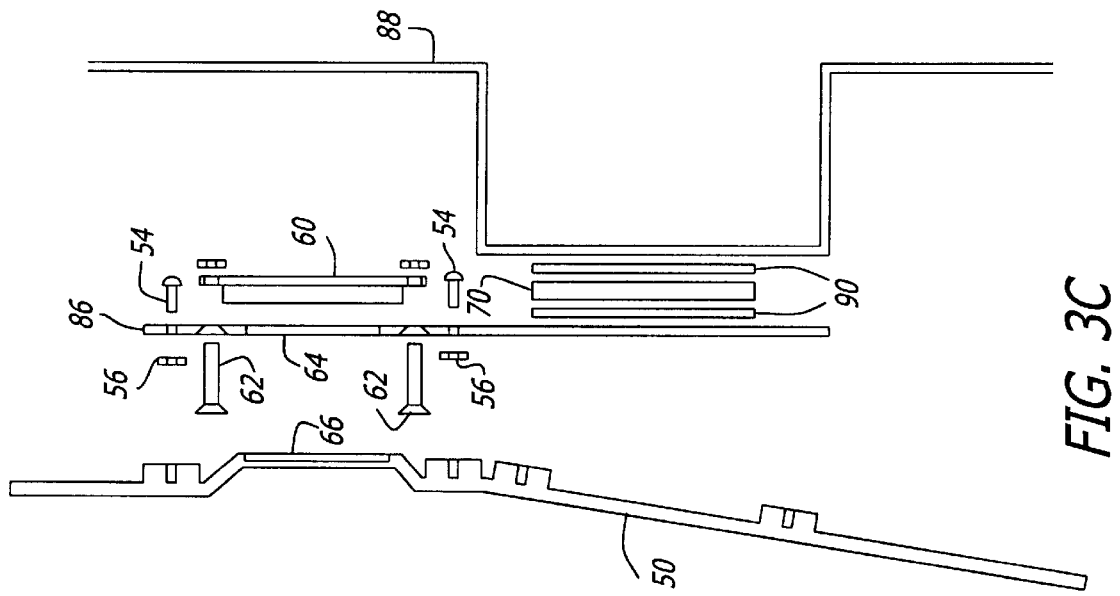
FIG. 3C is an internal sectional view of one embodiment of the electronic security entry system of FIG. 1, in which heat is transferred from the display to the rear of the enclosure, taken along the line 3—3.
Figure 3B:
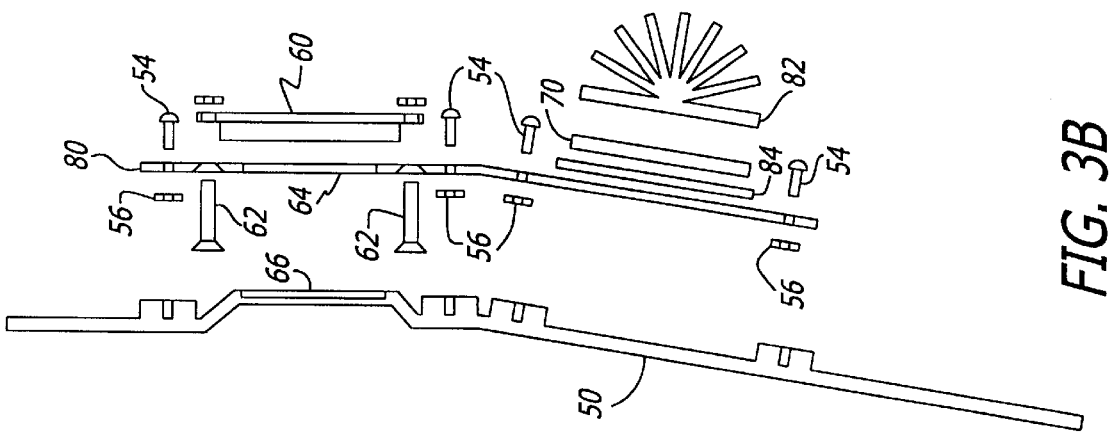
FIG. 3B is an internal sectional view of one embodiment of the electronic security entry system of FIG. 1, in which heat is transferred from the display to the air inside the enclosure, taken along the line 3—3.
Figure 3A:
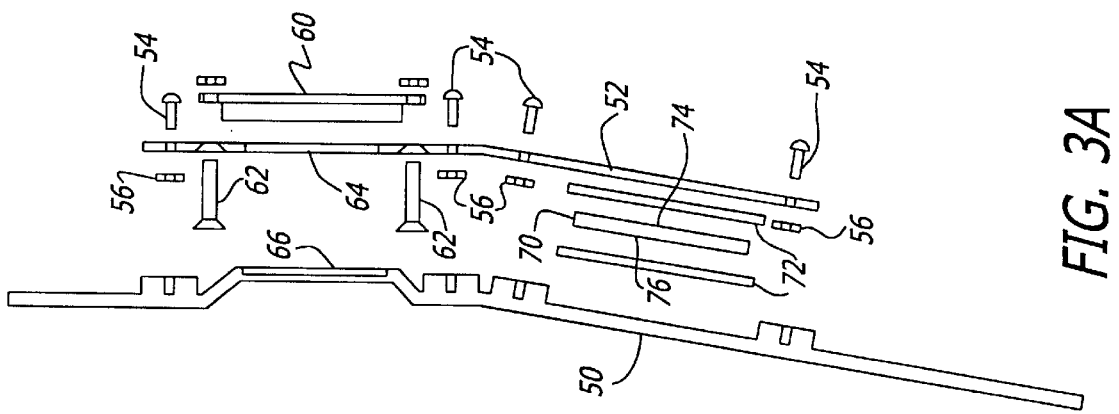
FIG. 3A is an internal sectional view of one embodiment of the electronic security entry system of FIG. 1, in which heat is transferred from the display to the front panel of the enclosure, taken along the line 3—3.

FIG. 3A represents one embodiment of the subsystem used to keep the display unit 32 (FIG. 2) within a predetermined range of operating temperatures.

A front panel 50 of the enclosure E of the entry control panel P serves as a foundation for the cooling subsystem. Behind the front panel 50 is mounted a thermally conductive mounting plate 52. The mounting plate 52 is connected to the front panel 50 by way of a set of screws 54, which are preferably substantially thermally insulating, so that the mounting plate 52 and the front panel 50 remain essentially thermally isolated. Thermally insulating washers 56 can be used to facilitate this arrangement.

The mounting plate 52 serves to hold a liquid crystal display ("LCD") 60, which is part of the display unit 32 (FIG. 2). As discussed above, the LCD 60 is a thermally sensitive device. Accordingly, the LCD 60 is attached to the mounting plate 52 via thermally conductive fasteners 62, so that the mounting plate 52 is capable of conducting a substantial amount of heat away from the LCD 60. In a preferred arrangement, the viewable display area D (FIG. 1) of the LCD 60 is positioned behind an opening 64 defined by the mounting plate 52, which is respectively positioned behind a window 66 in the front panel 50. The window 66 is preferably transparent, and provides a vandal-resistant barrier between the LCD 60 and the outside environment.

A thermoelectric cooling device 70 is positioned between the front panel 50 and the mounting plate 52, in such a way that thermal conduction is possible between the mounting plate 52 and the cooling device 70, and between the cooling device 70 and the front panel 50. Thermal gaskets 72 are provided on both sides of the cooling device 70 to facilitate such conduction.

In a preferred embodiment, the cooling device 70 is a Peltier junction having approximate dimensions of 1.6"× 1.6"×0.125" thick. As is well known, when an electrical potential is applied across a Peltier junction, heat is transferred from one side (a "cool side") 74 to the other side (a "hot side") 76. Accordingly, for purposes of the present invention, the cooling device 70 is positioned so that the cool side 74 is adjacent to the mounting plate 52, and the hot side is adjacent to the front panel 50. As described above, the mounting plate 52 is substantially thermally isolated from the front panel, so the cooling device 70 comprises essentially the only path for heat conduction between the mounting plate 52 and the front panel 50.

When power is applied to the cooling device, heat is transferred from the mounting plate 52 to the cool side 74 of the cooling device 70, and from the hot side 76 of the cooling device 70 to the front panel 50. Consequently, heat is drawn away from the LCD 60, which is mounted in a thermally conductive relationship with the mounting plate 52. This action can be selectively performed to cool the LCD 60 only when necessary, so that it remains within a preferred range of operating temperatures.

An alternative arrangement of the subsystem utilized to keep the LCD 60 within a preferred range of operating temperatures is shown in FIG. 3B. Like the embodiment of FIG. 3A, the cooling subsystem of FIG. 3B has a thermally conductive mounting plate 80 mounted so as to be thermally isolated from the front panel 50. However, the cooling device 70 is mounted to a heat sink 82 capable of transferring heat from the cooling device 70 to air within the enclosure E. A single thermally conductive gasket 84 is provided to facilitate heat conduction from the mounting plate 80 to the heat sink 82.

A further alternative arrangement of the cooling subsystem is shown in FIG. 3C. Again, a thermally conductive mounting plate 86 is mounted so as to be thermally isolated from the front panel 50. The cooling device 70 is mounted between the mounting plate 86 and a rear panel 88 of the enclosure E; two thermally conductive gaskets 90 may be provided to facilitate heat conduction. Accordingly, heat is conducted away from the LCD 60, through the mounting plate 86 to the cooling device 70, and from the cooling device 70 to the rear panel 88.

In a preferred embodiment of the present invention, the cooling device 70 (FIGS. 3A, 3B, and 3C) is operated only when conditions so require. Consequently, as shown in FIG. 4, the power source 10 is connected through a thermal closing switch 92 to the cooling device 70. The thermal closing switch 92 is positioned so as to react to the temperature of the LCD 60.

The thermal closing switch 92, when the temperature of the LCD 60 remains below a predetermined threshold, does not allow current to flow. However, when the temperature exceeds the threshold, the switch 92 will close, thereby activating the cooling device 70 and causing heat transfer away from the LCD 60 in the manner previously described. In a preferred embodiment, the thermal closing switch 92 is calibrated so as to maintain the temperature of the LCD 60 below approximately 70 degrees Celsius.

The thermal closing switch 92 is preferably a simple bi-metallic strip; such devices are simple, inexpensive, reliable, adjustable, and well-known in the art. However, it is recognized that a more complex system might be advantageous in certain circumstances. For example, a temperature sensor can be coupled to the processing unit 30 (FIG. 2); the processing unit 30 would then actuate a switch to control the cooling device 70.

Figures 4, 5:
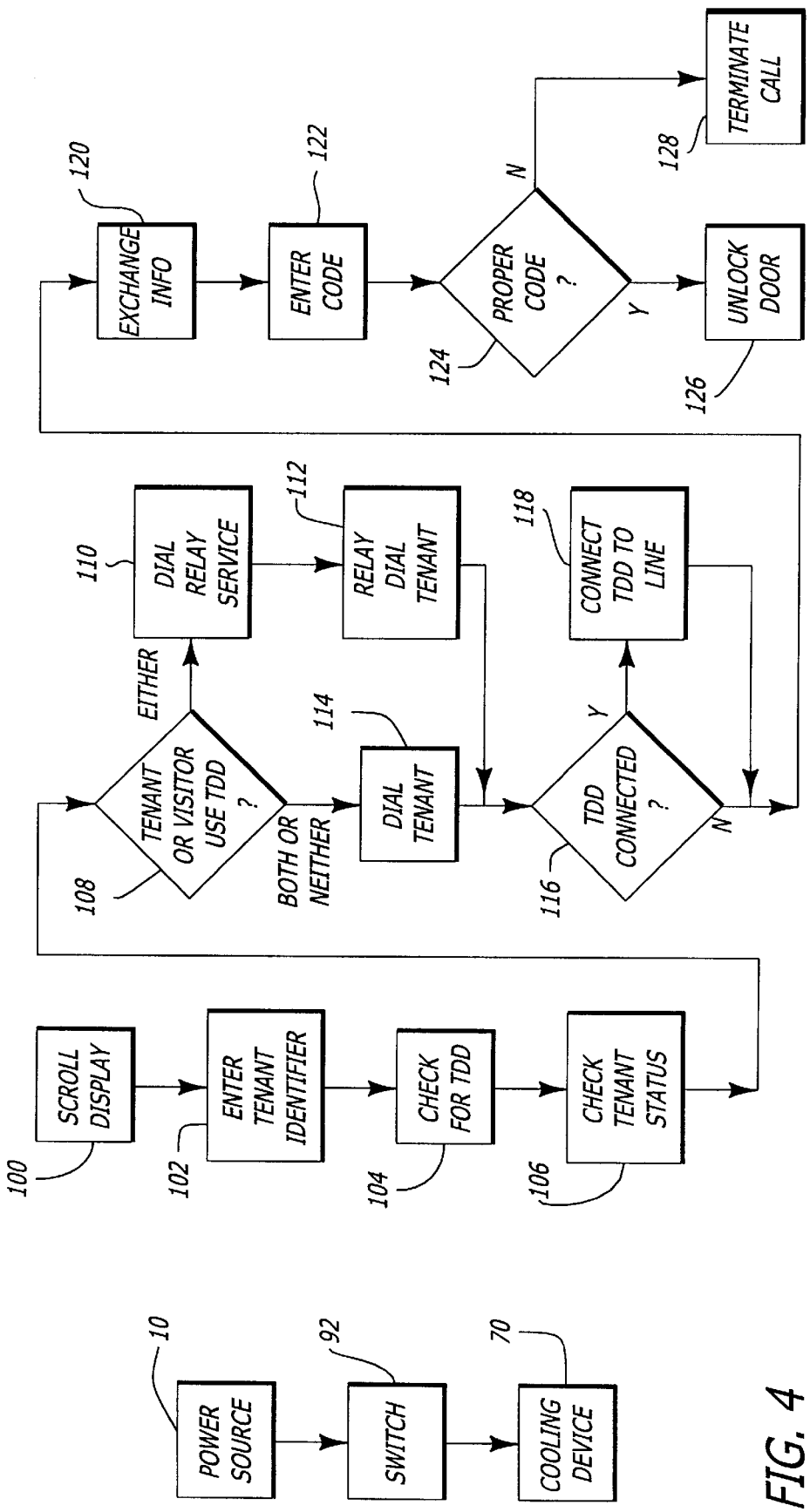
FIG. 4 is a block diagram illustrating how the display of the electronic security entry system of FIG. 1 is cooled.
FIG. 5 is a flowchart illustrating how the electronic security entry system of FIG. 1 functions when operated by a typical visitor (whether or not hearing-impaired) to contact a typical tenant (whether or not hearing-impaired).

The operation of the present system is depicted in the flowchart of FIG. 5. First, a visitor uses the keypad K to scroll information shown on the display area D until the desired tenant's name is displayed (step 100). Next to the tenant's name will be displayed a numeric identifier. The numeric identifier is used for privacy purposes, so as not to disclose tenants' telephone numbers.

The visitor, again using the keypad K, will then enter the numeric identifier corresponding to the desired tenant (step 102). The processing unit 30 is able to use the numeric identifier to retrieve information stored in the memory subsystem 36 corresponding to the desired tenant (e.g. the tenant's telephone number, and whether or not the tenant is hearing-impaired).

The processing unit 30 will then determine whether a TDD is connected to the TDD interface 44 (step 104). This may be accomplished in two ways. The hearing-impaired visitor may have been provided a special access code to enter into the keypad K. Alternatively, the processing unit can automatically detect the presence of a TDD at the TDD interface 44. Since a TDD operates in a manner similar to a computer modem, this detection process is simple and well-known.

The processing unit 30 will then determine the hearing status of the tenant, i.e. whether the tenant is hearing-impaired (step 106). This is done by accessing the memory subsystem 36 for data corresponding to the desired tenant selected above (at step 102). Such status information will have been stored within the memory subsystem 36, along with tenant names, telephone numbers, and other information, for use by the present system.

After it has been determined whether either the visitor or the tenant are hearing-impaired, or both (step 108), a communication link is established between the entry control panel P and the tenant. If neither the visitor nor the tenant use a TDD, or if both do, the tenant is dialed directly (step 114), using a telephone number retrieved from the memory subsystem 36. No intermediate steps are required to be performed by the present system.

If either the tenant or the visitor uses a TDD, but not both, a relay service is dialed by the entry control panel P (step 110). The telephone number for the relay service is programmed and stored within the memory subsystem 36. The relay service is then instructed to dial the tenant (step 112). The latter step can be performed by use of a synthesized voice generated by the processing unit 30, instructing the relay service operator to dial a particular telephone number, or by passing the appropriate telephone number to the relay service as a machine-readable code.

In the foregoing manner, one of four types of communications links is established between the visitor at the entry control panel P and the tenant: (1) voice-to-voice, without the use of a relay service; (2) TDD-to-TDD, without the use of a relay service; (3) voice-to-TDD, through a relay service; or (4) TDD-to-voice, through a relay service.

If it was previously determined (at step 104) that a TDD is connected to the jack J (step 116), then the TDD interface 44 is coupled to the communications line 40 (step 118) for the duration of the call, which in a preferred embodiment is limited to approximately two minutes. The two-minute timeout is provided to avoid abuse of the present system for personal telephone calls. Furthermore, at any time, if any signal other than a proper TDD data signal is detected by the processing unit 30 to be originating from the jack J, then the TDD interface 44 can be disconnected from the communications line. This will prevent certain abuses of the present system, such as attempts to attach a standard telephone unit to the TDD jack J.

After connection is established, the visitor and the tenant may then exchange verbal information and/or TDD-based information as desired (step 120).

If the tenant decides to admit the visitor, an authorization code must be entered into to the entry control panel P (step 122). This can be accomplished in two ways. When a voice-to-voice link is being used, the tenant may enter a numeric code into the keypad on his telephone equipment. As is known in the art, the numeric code will be sent over the telephone line as "touch tone" signals, which may then be decoded by the telephonic interface 38 and the processor unit 30. However, it should be noted that when a relay service or a TDD-to-TDD link is being used, any touch-tone keypresses made by the tenant generally will not be received by the entry control panel P. Consequently, that means of entering an authorization code generally is not available under such circumstances. An alternative is provided: in one embodiment, the tenant provides a numeric code to the visitor, either verbally, through the relay service, or via TDD data. The visitor will then, using the keypad K, enter the numeric code into the system.

In either case, the processor unit 30, by accessing the memory subsystem 36, must determine whether the numeric code entered is proper (step 124). If so, the door will be unlocked (step 126). If not, the call will be terminated without unlocking the door (step 128).

In view of the above explanation of the exemplary system, it will be appreciated that embodiments of the present invention may be employed in many different applications to provide directory information and control access to an area. While certain exemplary structures and operations have been described herein, the appropriate scope hereof is deemed to be in accordance with the claims as set forth below.

What is claimed is:

1. An electronic directory and entry control system for controlling access to an entryway, comprising:
   an enclosure having a window;
   a display unit mounted within said enclosure for viewing behind said window;
   a keypad;
   a processing unit;
   memory;
   actuator control means for unlocking an access door;
   a telephonic interface; and
   a jack capable of accommodating a Telecommunications Device for the Deaf.

2. The directory and entry control system of claim 1, wherein said telephonic interface is coupled to a communications line.

3. The directory and entry control system of claim 2, wherein said jack is selectively connected to said communications line.

4. The directory and entry control system of claim 3, wherein said jack is connected to said communications line upon a determination of the presence of a Telecommunications Device for the Deaf.

5. The directory and entry control system of claim 4, wherein said determination is performed automatically by said processing unit.

6. The directory and entry control system of claim 4, wherein said determination is performed by verifying a code entered by a visitor.

7. The directory and entry control system of claim 4, wherein said jack is disconnected from said line within a limited time period.

8. The directory and entry control system of claim 4, wherein said jack is disconnected from said line if a signal other than a data signal generated by said Telecommunications Device for the Deaf is detected.

9. The directory and entry control system of claim 4, wherein said processing unit causes a synthesized voice announcement to be made.

10. The directory and entry control system of claim 1, wherein said keypad comprises a single sealed unit.

11. The directory and entry control system of claim 10, wherein said keypad comprises 16 keys.

12. The directory and entry control system of claim 10, wherein said keypad includes a plurality of keys usable to control information presented on said display unit.

13. A method for operating a directory and entry control system having a keypad, comprising the steps of:

selecting a desired tenant by utilizing said keypad;

confirming whether a Telecommunications Device for the Deaf is connected;

determining whether said desired tenant is hearing-impaired;

dialing a telephone number corresponding to said desired tenant;

communicating with said desired tenant;

entering an authorization code;

verifying the validity of said authorization code; and unlocking an entry door if said authorization code is valid.

14. The method of claim 13, further comprising the step of coupling said Telecommunications Device for the Deaf to a communications line after said dialing step, if said confirming step was successful.

15. The method of claim 14 further comprising the step of: decoupling said Telecommunications Device for the Deaf from said communications line within a limited time period.

16. The method of claim 14 further comprising the step of:

decoupling said Telecommunications Device for the Deaf from said communication line if a signal other than a data signal generated by said Telecommunications Device for the Deaf is detected.

17. The method of claim 13, wherein if a Telecommunications Device for the Deaf is connected and said desired tenant is not hearing-impaired, said dialing step comprises the steps of:

contacting a relay service; and causing said relay service to dial the telephone number corresponding to said desired tenant.

18. The method of claim 17 wherein said step of causing said relay service to dial the telephone number corresponding to said desired tenant further comprises the step of: causing a synthesized voice announcement to be made.

19. The method of claim 13, wherein if a Telecommunications Device for the Deaf is not connected and said desired tenant is hearing-impaired, said dialing step comprises the steps of:

contacting a relay service; and causing said relay service to dial the telephone number corresponding to said desired tenant.

20. The method of claim 13, wherein the confirming step comprises the substeps of:

receiving a numeric code entered on said keypad; and checking said numeric code against an access code.

21. The method of claim 13, wherein the confirming step comprises the substeps of:

polling a jack for the Telecommunications Device for the Deaf;

receiving a response indicating the presence of the Telecommunications Device for the Deaf.

22. The method of claim 13, wherein the entering step comprises the substeps of:

receiving a touch-tone code entered on a remote telephone; and converting said touch-tone code to a numeric authorization code.

23. The method of claim 13, wherein the entering step comprises the substeps of:

communicating an authorization code to a user of said keypad; and inputting said authorization code via said keypad.

24. The method of claim 13 further comprising the step of:

providing a door position signal to control said system.

\* \* \* \* \*